958,063.

Patented May 17, 1910.

Stone coated with asphaltic cement and pressed into lower layer of soft Portland cement concrete

WITNESSES:

INVENTOR.
Joseph Day Amies.
BY
William J. Jackson.
ATTORNEY.

JOSEPH HAY AMIES, OF PHILADELPHIA, PENNSYLVANIA, ASSIGNOR TO THE AMIES ASPHALT COMPANY, OF PHILADELPHIA, PENNSYLVANIA, A CORPORATION OF SOUTH DAKOTA.

STREET AND ROAD CONSTRUCTION.

958,063.

Specification of Letters Patent. Patented May 17, 1910.

Application filed February 20, 1909. Serial No. 479,252.

*To all whom it may concern:*

Be it known that I, JOSEPH HAY AMIES, a citizen of the United States, residing at Philadelphia, in the county of Philadelphia and State of Pennsylvania, have invented certain new and useful Improvements in Street and Road Construction, of which the following is a specification, reference being had to the accompanying drawings, forming part hereof, and in which—

Figure 1:
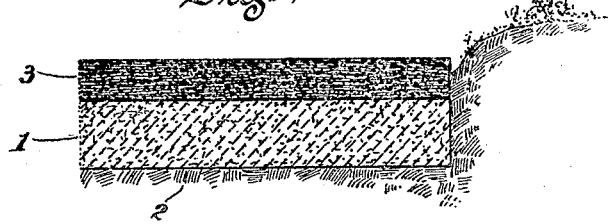
Figure 2:
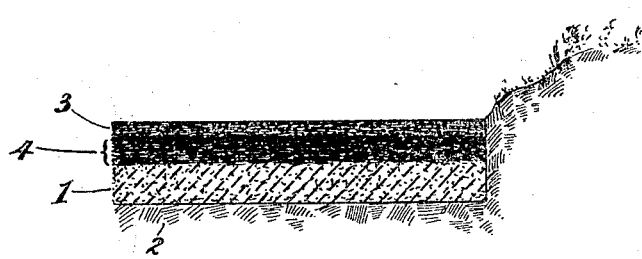

Figure 1, is a vertical transverse sectional view illustrating the first step in my road construction and Fig. 2, is a similar view illustrating the finished road construction.

This invention relates especially to the employment of Portland cement in the construction of country roads. It is a well known fact that concrete made of Portland cement, broken stone and sand and grit, secures the most permanent and lasting form of construction. But for road and street endurance it is defective, owing to its extreme hardness and brittleness, which allow of rapid granulation caused by concussion and the attrition of traffic.

It is one object of my invention to overcome this objection.

It is another object of my invention to prevent the smoothness which comes to the surface of Portland cement concrete roads, causing danger to traffic by slipperiness.

Another object of my invention is to dissipate shock, and thus to make travel less destructive and painful to animals compelled to pass thereover.

Another object of my invention is to provide a water-shed for the top surface of my Portland cement concrete pavement.

The most effective cause of the destruction of Portland cement concrete is owing to the fact that the face of the concrete absorbs a small amount of water and when freezing occurs expansion takes place and in time causes shelling under traffic and then rapid crumbling. I obviate this.

Another object of my improvement is to prevent the tendency to cracking and seaming which are ordinarily induced by the contraction and expansion of the concrete caused by the changes in temperature.

But chiefly, the object of my invention is to secure a permanent and lasting form of construction at a cost but little if any higher than the cost of building the common stone or macadam road, and also I am able to reduce the cost of maintenance to a minimum. I do not confine my invention to the construction of roads and streets, for it will be particularly adapted to the building of sidewalks, cellar bottoms, floors, paths, etc.

I will now briefly describe my process:—

I take a ton of crushed stone and separate its particles. For my purpose the largest grade of the broken stone in the mass should go through a $3\frac{1}{2}$ inch ring or mesh. The next grade should go through a ring or mesh $2\frac{1}{2}$ inches in size and the next should pass through a ring or mesh $1\frac{1}{2}$ inches in size. I continue this until I get all the broken stone separated from the stone dust. I separately weigh and then separately measure each grade. Last of all I weigh and measure the stone dust. I go over this process with the stone from any particular crusher until I reduce the weights and measures of the different sizes to exactness. In practicing the invention, the stone is used in ton lots and it is desirable to use the full ton weight of stone and stone dust for separation. If the stone and stone dust were measured only, then an exact ton weight might not be used. I then add two measures of Portland cement to each single measure of the stone dust. While in a dry state I thoroughly mix the Portland cement and the stone dust and then add three measures of water for every single measure of cement used. I make a thin mortar of the cement and stone dust using as much water as possible without drowning the cement. Having done this I work all the grades of stone mentioned into the said mortar and then immediately lay the same as indicated at 1, in the drawings upon a well rolled sub-grade 2. But should I desire to use pebbles or gravel instead of stone or any other suitable material I weigh them and measure them to find the best manner of combining them.

I have previously treated a portion of the above mentioned graded stones in the following manner:—I place them in a mixing machine or upon a mixing board and then mix them with a suitable asphalt or bituminous or resinous or carbonaceous cement, either separately or combinedly. When the said stones have been well coated with the said cement, I add a desired amount of calcium oxid or calcium hydrate, and when this is well mixed in I throw thereon and mix therewith a stone dust and grit which I have set aside and dampened with water, and mixed with calcium oxid. This treatment causes the mixture to assume a granular and friable condition. The effect of the calcium oxid is to procure an age lasting cement of the bituminous elements and to make it indifferent to changes in solar temperatures. This composition designated 3, in the drawings I now spread over the Portland cement concrete which I have just laid and before the initial set of the concrete aforesaid can begin, I roll or otherwise compress the bituminous composition 3 just described into the soft concrete 1. I continue this compressing until the bituminous composition is well pressed into the concrete as at 4, (see Fig. 2) and comes almost to a level with the face thereof. Or I may mix the said bituminous compositions with the Portland cement instead of using the crushed stone before mentioned. But this latter process is more costly and does not give as satisfactory results. I now shut off the street or road from traffic until the subconcrete has become perfectly set. It will then be open to traffic.

I have now described an age lasting road surface, and the cost will not necessarily be higher than the usual cost of an ordinary Portland concrete street or road because the thickness of the composition generally laid will need to be considerably greater than in the case of my improvement, because I dissipate shock and prevent attrition. Every objection to a Portland cement concrete pavement will be found to be entirely obviated in my case and a perfectly constructed road will be secured. In road construction and in sidewalk making it may occur to be practically impossible to secure stone for a concrete and a topping for my roads, etc., in which case, the soil that may be present must be used, or soil that may be contiguous thereto must be employed. In such cases I first mix the soil of the subface with calcium oxid or calcium hydrate and then mix the said soil with Portland cement, and instead of using stone for the ultimate topping, I use the soil that may be present or contiguous thereto, and mix it with the bituminous elements in the same manner as that described for the coating of the graded stone mentioned. The said soil bituminous composition is worked into the concrete made with Portland cement and soil, precisely as in the case when stones are used as above described.

What I claim is:—

The herein described method of constructing roads, streets and the like which consists in mixing duly graded and proportioned crushed stone and the like with water and Portland cement to form a base, then placing thereon and thereover a due amount of crushed stone and the like the same having previously been coated with asphaltic cement and the like and then pressing the asphaltic coated stone down into the soft cement base before the initial set of the Portland cement concrete takes place, substantially as described.

In testimony whereof I have hereunto signed my name.

JOSEPH HAY AMIES.

Witnesses:
WILLIAM J. JACKSON,
S. F. KOCH.